PHONOGRAPH PICKUP

Filed Oct. 11, 1965 4 Sheets-Sheet 1

Inventor
Paul E. VandeKoppel
By Frost, Burmeister & Kulie
Attorneys

Inventor
Paul E. VandeKoppel
By Frost, Burmeister & Kulie
Attorneys

Inventor
Paul E. VandeKoppel
By Frost, Burmeister & Kulie
Attorneys

Inventor
Paul E. VandeKoppel
By Frost, Burmeister & Kulie
Attorneys

United States Patent Office 3,523,690

Patented Aug. 11, 1970

3,523,690
PHONOGRAPH PICKUP

Paul E. VandeKoppel, Niles, Mich., assignor, by mesne assignments, to Electro-Voice, Incorporated, Buchanan, Mich., a corporation of Delaware Filed Oct. 11, 1965, Ser. No. 494,800
Int. Cl. G11b 3/02
U.S. Cl. 274—37 13 Claims

ABSTRACT OF THE DISCLOSURE

A stereophonic phonograph pickup is disclosed in which two flat elongated piezoelectric generating elements are molded into an assembly with a rectangular backpad and a yoke of compliant material. A casing is provided for the pickup with a removable cover, and an opening on the side of the casing opposite the cover so that the generating element assembly may be placed within the casing with the yoke protruding from the opening and the cover secured to the casing to properly position the generating element assembly within the casing. A stylus drive arm assembly is secured to the exterior surface of the casing with the drive arm engaging the protruding portion of the yoke by means of a clip of resilient material which engages slots in the wall of the casing to hold it in position. The drive arm utilizes a flexible sleeve between a stub which engages the clip and the drive arm itself. The elongated ceramic elements of the generating element assembly protrude from both sides of the backpad, and the casing exposes at one end the backpad and the protruding generating elements. The protruding generating elements are each provided with electrodes on opposite surfaces, and a clip having a pair of resilient jaws of electrically conducting material is inserted in the open end of the casing so that the jaws engage the electrodes of the generating elements to make electrical contact therewith.

The present invention relates generally to phonograph pickups, and in particular to the construction of such pickups and methods of fabricating and assembling phonograph pickups.

The present invention has utility for both monaural and stereophonic phonograph pickups, but since it is of particular advantage in a stereophonic phonograph pickup, it will be illustrated in this form. The present invention may be utilized with any elongated generating element which acts as an electromechanical transducer to produce an electrical signal responsive to a force exerted on the elongated element. The invention is particularly applicable to piezoelectric generating elements, and is illustrated herein as applied to a stereophonic phonograph pickup utilizing bender type piezoelectric ceramic generating elements.

One type of stereophonic phonograph pickup employed prior to the present invention utilizes a pair of bender type piezoelectric elongated elements which are mounted with their axes of elongation generally parallel to each other on a compliant backpad which positions the elements relative to a casing, the elements being disposed within an elongated cavity within the casing. The end of the piezoelectric elements opposite the backpad are mounted in a Y-shaped yoke, one element being affixed to the end of one of the legs of the yoke and the other element being affixed to the end of the other leg of the yoke. The junction portion of the yoke passes through an opening in the casing of the phonograph pickup and engages a stylus drive arm which is mounted at one end of the exterior surface of the casing and carries a stylus at its opposite end. The patent application of Durbin and Wood, Ser. No. 736,819, filed May 12, 1958, now abandoned, illustrates such a phonograph pickup.

Phonograph pickups constructed in the manner described above have been highly successfuly. It is an object of the present invention to provide a phonograph pickup and a method of making the phonograph pickup which may be applied to stereophonic phonograph pickups of the type described above and which will result in a lower manufacturing cost. In order to reduce the manufacturing costs of phonograph pickups, it is an object of the present invention to provide a phonograph pickup construction which reduces the number of steps required to assemble the phonograph pickup.

As in all manufacturing, stereophonic phonograph pickups of the type described above have resulted in production rejects. It is an object of the present invention to provide a phonograph pickup construction which inherently reduces the relative number of production rejects. One of the causes for production rejects of stereophonic phonograph pickups of the type described above is scraping of the movable portions of the ceramic elements or the yoke against the casing of the pickup caused by improper location of the yoke or backpad relative to the ceramic elements or relative to the casing. It is an object of the present invention to substantially eliminate production rejects for this cause.

Piezoelectric ceramic elements are fragile, and a substantial number of piezoelectric elements have been broken in the process of installing yokes and backpads on the elements. It is a further object of the present invention to substantially eleminate breakage of piezoelectric ceramic elements from these causes.

Further, it is an object of the present invention to provide a method for manufacturing a sub-assembly of piezoelectric elements, backpad, and yoke in which the backpad and yoke may be simultaneously mounted and affixed to the piezoelectric elements.

In prior piezoelectric phonograph pickup, the piezoelectric elements were connected to the terminals of a socket mounted on the casing of the phonograph pickup, and a mating plug was utilized with a cable to make electrical connection between the other elements of the phonograph and the piezoelectric elements of the pickup. It is an object of the present invention to provide a phonograph pickup construction in which the casing and piezoelectric elements themselves form an electrically connecting socket which may be directly engaged by a mating plug to provide electrical connection to the electrodes of the piezoelectric elements.

These and further objects of the present invention will be readily apparent to those skilled in the art from a further consideration of this specification, particularly when viewed in light of the drawings, in which.

Figures 1, 2, 3, 4:
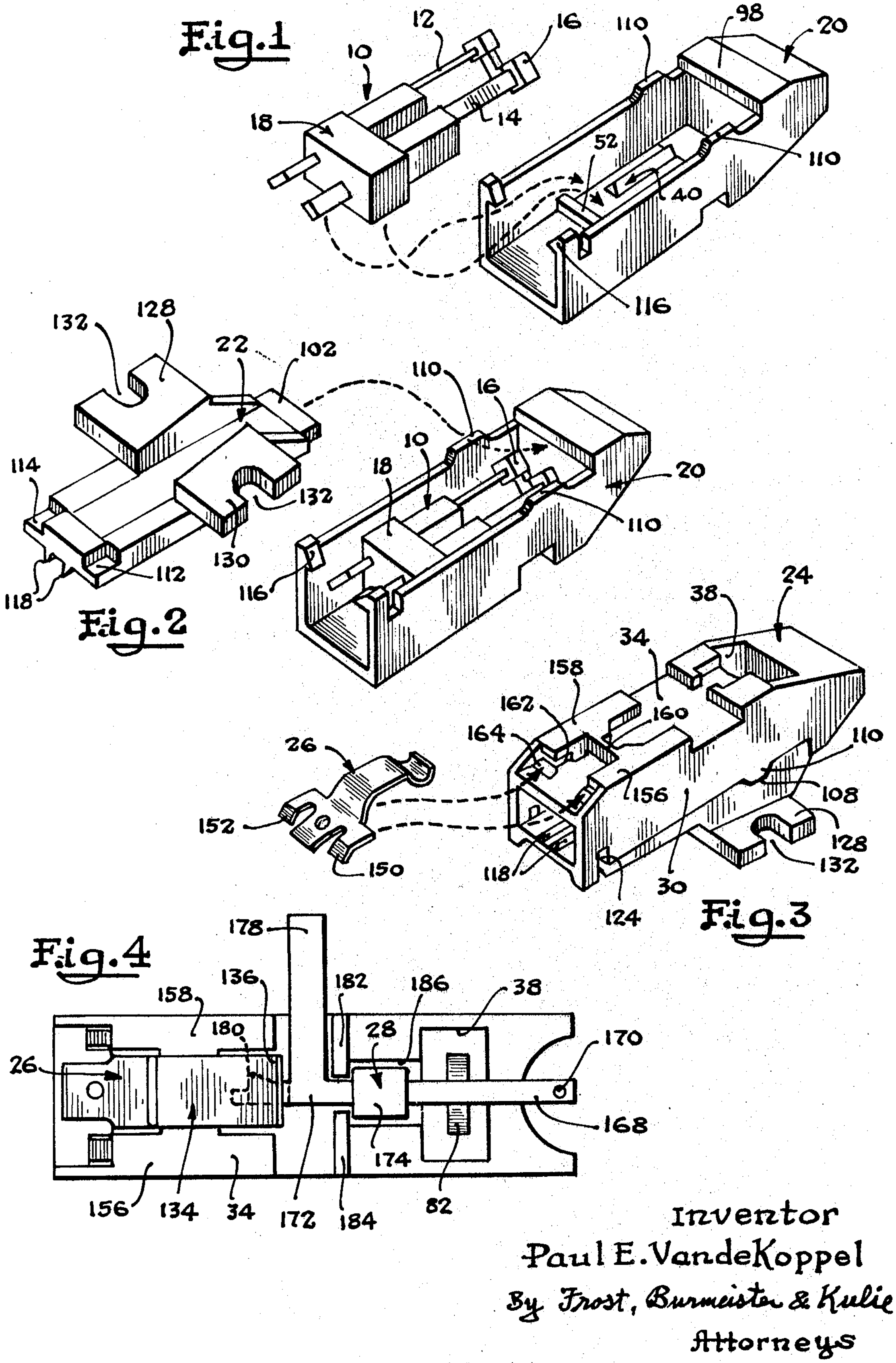
FIGS. 1 through 3 illustrate the assembly of a phonograph pickup constructed according to the teachings of the present invention.
FIG. 4 is an elevational plan view of the phonograph pickup illustrated in FIGS. 1 through 3.

FIGS. 1 through 3 illustrate the basic steps in assemblying a phonograph cartridge constructed according to the teachings of the present invention. As indicated in FIG. 1, a generating element assembly 10 which includes two piezoelectric elements 12 and 14 which extend between a yoke 16 and a backpad 18, is positioned in an enclosure body 20. The enclosure body 20 receives the generating element assembly 10 and properly positions the generating element assembly 10 and maintains it in a proper position. As FIG. 2 illustrates, a cover 22 fits into position on the enclosure body 20 to lock the geenrating element assembly 10 in position. FIG. 3 illustrates this stage of the assembly, and also isometrically the exterior surface of the casing 24 formed by the enclosure body 20 and cover 22. In addition, FIG. 3 illustrates the manner in which the stylus assembly clamp 26 is mounted on the casing 24. FIGS. 4 illustrates the stylus assembly 28 mounted on the casing 24 by means of the clamp 26.

Figures 5, 6, 7, 8, 9, 10:
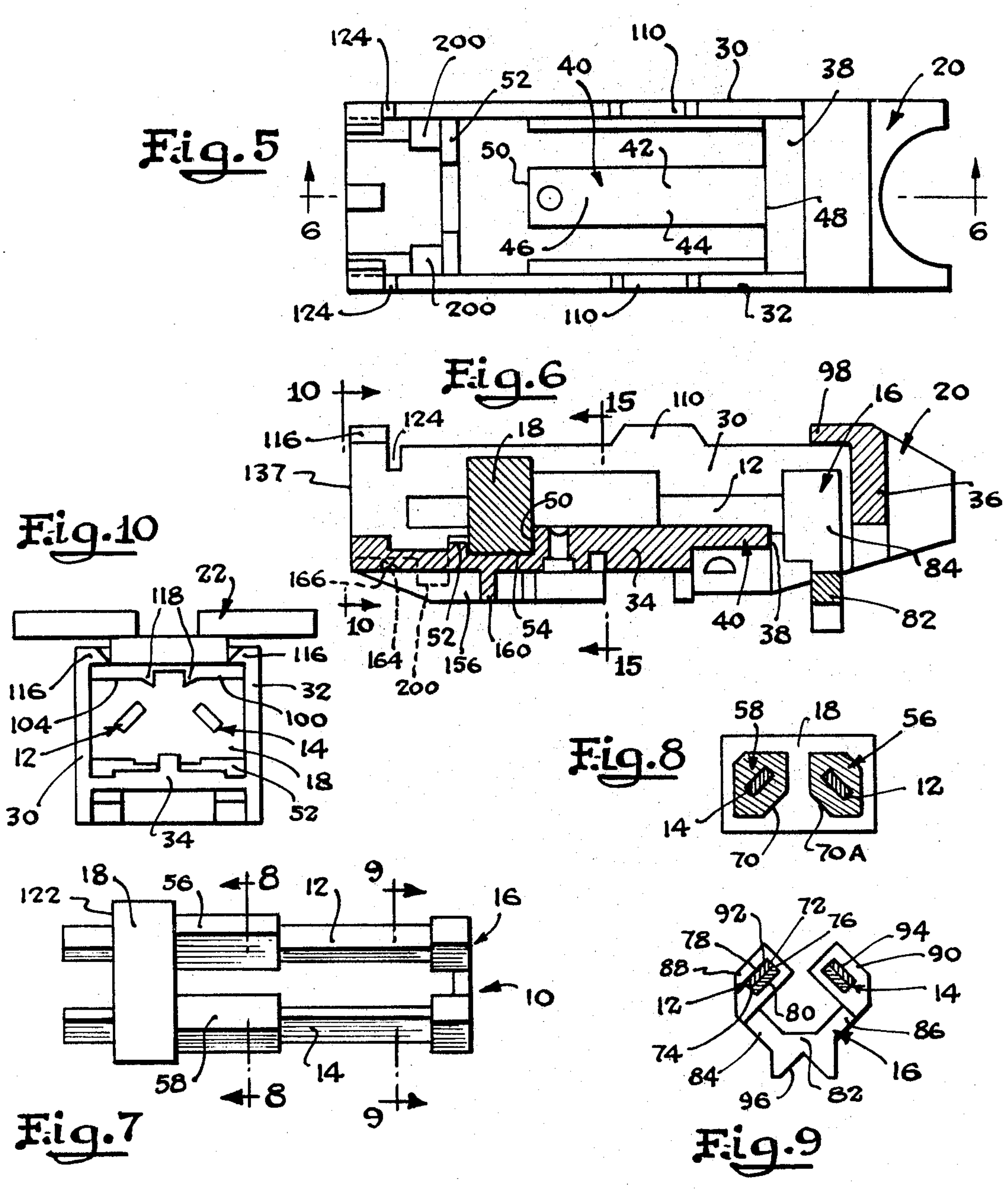
FIG. 5 is a top elevational view of the enclosing body of the casing of the phonograph pickup illustrated in FIGS. 1 through 4.
FIG. 6 is a sectional view taken along the line 6—6 of FIG. 5 and illustrating the generating elements assembly in position.
FIG. 7 is a top plan view of the generating element assembly.
FIG. 8 is a sectional view taken along the line 8—8 of FIG. 7.
FIG. 9 is a sectional view taken along the line 9—9 of FIG. 7.
FIG. 10 is an end elevational view of the assembled cartridge taken along the line 10—10 of FIG. 6, the cover of the casing being in position.

FIGS. 5 and 6 illustrate the construction of the enclosure body 20. The body 20 has two parallel walls 30 and 32 which extend from a base 34. A forward bulkhead 36 also extends normally from the flat base 34 and is integral with the walls 30 and 32. The base 34 has an opening 38 adjacent to the forward bulkhead 36, and a rib 40 extends from the opening 38 parallel to the walls 30 and 32. The rib 40 has two flat surfaces 42 and 44 which intersect centrally of the rib along a straight line 46. The forward end 48 of the rib 40 terminates at the opening 38 in a straight edge perpendicular to the walls 30 and 32. The rearward end 50 of the rib 40 also terminates in a straight edge perpendicular to the walls 30 and 32, and the end 50 of the rib 40 is spaced from a bar 52 extending from the inner surface of the base 34 and disposed perpendicular to the walls 30 and 32. In this manner, a recess 54 is formed on the inner surface of the base 34 between the parallel walls formed by the end 50 of the rib 40 and the bar 52.

Figure 15:
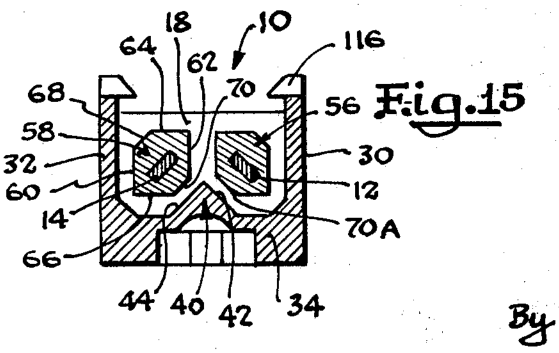
FIG. 15 is a sectional view taken along the line 15—15 of FIG. 6.
Figure 12:
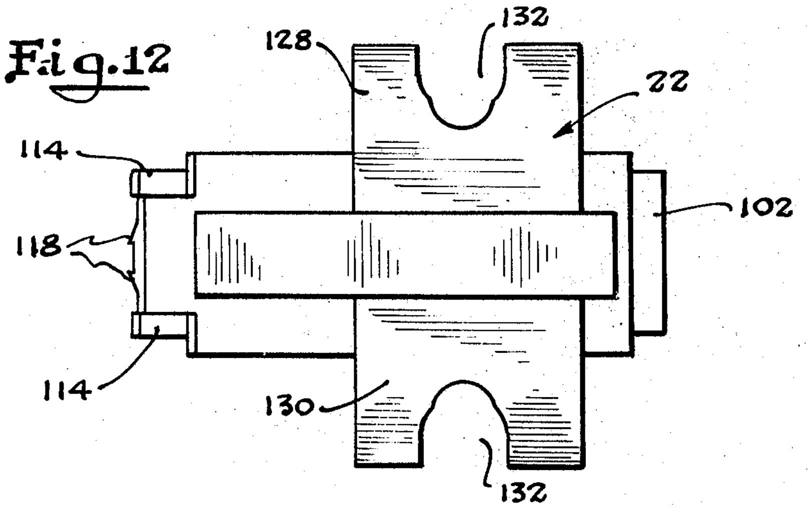
FIG. 12 is a plan view of the cover of the casing.
Figure 11:
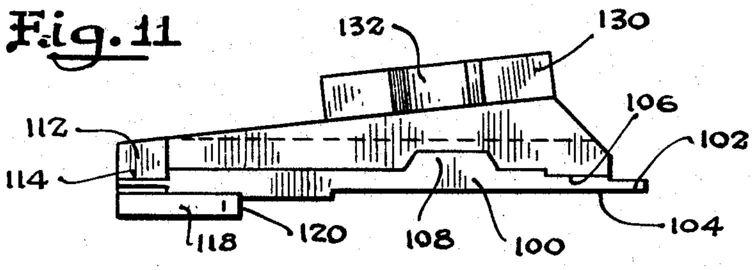
FIG. 11 is a side elevational view of the cover of the casing.

The generating element assembly 10 has a quadrangular backpad 18 with a length approximately equal to the distance between the walls 30 and 32 and a thickness approximately equal to the distance between the bar 52 and the end 50 of the rib 40. The backpad 18 is snugly disposed within the enclosure body between the end 50 of the rib 40 and bar 52, and extends from the surface of the recess 54 to abutment with the cover 22, as will be hereinafter described. FIGS. 2, 6 and 15 best illustrate the position of the backpad 18 in the enclosure body 20.

The generating element assembly 10 has an elongated sleeve 56 which extends from the backpad 18 encompassing the generating element 12 toward the yoke 16. In like manner, a second sleeve 58 extends from the backpad encompassing the generating element 14. The sleeves 56 and 58 are integral with the backpad 18 and function as damping members in the acoustical system for the generating elements 12 and 14. It is to be noted from FIGS. 8 and 15 that the sleeves 56 and 58 have a generally rectangular cross-section with flat surfaces 60 and 62 parallel to the walls 30 and 32 and flat surfaces 64 and 66 parallel to the base 34. This diagonally opposite corners of the sleeves 56 and 58, however, are provided with surfaces 68 and 70 which are parallel to the flat surfaces of the rib 40, these surfaces being designated 42 and 44. FIG. 15 illustrates that the flat surface 70 of the sleeve 58 is spaced from the surface 44 of the rib 40, and that the rib 56 is mirror image of the rib 58 with its corresponding surface 70A parallel to and spaced from the surface 42 of the rib 40. In operation, the sleeves 56 and 58 function to damp out undesired resonances in much the same manner as the construction shown in Pat. No. 3,060,280 of Wood entitled Electromechanical Transducer.

FIG. 9 illustrates the construction of the generating elements 12 and 14. Each of these elements is formed by a pair of flat slabs 72 and 74 which are assembled together by a thin layer 76 of electrically conducting material. Electrically conducting electrodes 78 and 80 are mounted on opposite sides of the slabs 72 and 74 from the central interconnecting layer 76. The slabs 72 and 74 are of piezoelectric material, such as polarized barium titinate or lead zirconium titinate. The slabs 72 and 74 are polarized in opposite directions relative to the central conducting layers 76 so that bending of the elements about an axis perpendicular to the axis of elongation of the elements and parallel to the electrodes 76, 78 and 80 generates voltages of opposite potential on the electrodes 78 and 80.

The ends of the elements 12 and 14 remote from the backpad 18 are mounted in an affixed yoke 16, as illustrated in FIGS. 1, 6, 7, and 9. The yoke 16 is also constructed of compliant material and has a central portion 82 from which two straight arms 84 and 86 extend outwardly perpendicular to each other. The arms 84 and 86 terminate at their ends remote from the central portion 82 in a hub 88 and 90 respectively, and the hubs 88 and 90 extend inwardly from the ends of the arm and are provided with central apertures 92 and 94 which accommodate the ends of the elements 12 and 14, respectively, and are secured thereon. The central portion 82 of the yoke 16 extends from the arms 84 and 86 in a Y-configuration, and the central portion 82 extends through the opening 38 in the base 34 of the enclosure body 20. A V-shaped recess 96 extends in the end of the central portion 82 remote from the arms 84 and 86 and engages the drive arm of the stylus assembly 28, as will be hereinafter more fully described.

As best illustrated in FIG. 6, the enclosure body 20 is provided with a lip 98 which extends backwardly from the forward bulkhead 36. The cover 22 is provided with a thin quadrangular portion 100 which has a width approximately equal to the distance between the walls 30 and 32 of the enclosure body 20 and is slidably disposed between the walls 30 and 32. The quadrangular portion 100 is provided with a forwardly extending flange 102 which is accommodated within the enclosure body 20 immediately confronting the lip 98 when the cover 22 is positioned on the enclosure body 20 to complete the casing 24. The quadrangular portion 100 has a flat surface 104 which is disposed parallel to the base 34 and which abuts the surface of the backpad 18 opposite the recess 54 to firmly wedge the backpad 18 within the casing 24. The cover 22 is provided with outwardly extending shoulders 106 on opposite sides of the central axis of the cover which confront and accommodate the upper edges of the walls 30 and 32, each of the shoulders 106 has a recess 108 extending therein in the plane of the walls 30 and 32. The recesses 108 accommodate outwardly extending keys 110 on the walls 30 and 32 which prevent the cover 22 from being translated along its axis when in position on the enclosure body 20.

Each of the shoulders 106 of the cover 22 is provided with an indentation 112 on the end of the cover opposite the flange 102. Each of the indentations 112 has a flat surface 114 which is engaged by an inwardly extending tab 116 protruding upwardly from the end of the walls 30 and 32. Each of the tabs 116 locks the cover 22 on the enclosure body 20 and secures the keys 110 of the walls 30 and 32 in engagement with the recesses 108 in the shoulders 106 of the cover. In this manner, a limited force is exerted on the backpad 18 by the surface 104 of the cover 22 and the surface of the recess 54 of the base 34. Also, as illustrated in FIGS. 3 and 10, a pair of parallel ribs 118 protrude from the flat surface 104 of the quadrangular portion 100 of the cover 22 forming a pair of shoulders 120 which abut the surface of the backpad 18 remote from the yoke 16, this surface being designated 122, and prevent the backpad 18 from being tilted against the bar 52 by a record force impressed on the yoke 16 in a direction toward the lip 98. It will be noted that it is not necessary to cement the backpad 18 within the casing 24, but merely to place the backpad in a proper position within the enclosure body 20 and snap the cover 22 in position by first inserting the flange 102 beneath the lip 98 and then exerting a downward pressure to force the tabs 116 to engage the flat surfaces 114 of the indentations 112 on the cover 22. A slot 124 is disposed in each of the walls 30 and 32 of the enclosure body parallel to the rear end 136 of the walls and forward of the tabs 116 in order to provide resilience to permit the tabs 116 to be displaced outwardly to receive the cover 22.

The cover 22 is also provided with a pair of mounting flanges 128 and 130 which are disposed in a common plane and extend outwardly relative to the axis of elongation of the casing 24. The plane of the flanges 128 and 130 is disposed at an angle to the axis of elongation of the casing 24 in order to properly orient the stylus relative to the record player conventionally employed, as will be more clearly apparent hereinafter. Each of the mounting flanges has a circular indentation 132 at its end for receiving a mounting screw in the conventional manner.

FIGS. 3, 4, 16 and 17 illustrate the clamp 26 which is used to maintain the stylus assembly 28 in position. The clamp 26 is constructed of resilient spring metal, and has a central elongated strip 134 which is provided with a bend at its one end forming a part cylindrical portion 136 with a central axis normal to the axis of elongation of the strip 134. The strip is also provided with two bends 138 and 140 near the center of the axis of elongation, and the bends 138 and 140 are normal to the axis of elongation and less than a right angle. The bend 140 is through a slightly greater angle than the bend 138 so that the part cylindrical portion 136 is spring biased downwardly relative to the flat end portion, designated 142, at the opposite end of the clamp 26.

The clamp 26 has a pair of flat tabs 144 and 146 disposed in the plane of the end portion 142 and extending outwardly from the axis of elongation of the clamp 26. The tabs 144 and 146 are provided with slots 148 parallel to the axis of elongation of the clamp 26 which provide a pair of fingers 150 and 152 which extend from the tabs 144 and 146 toward the end opposite the part cylindrical portion 136. The fingers 150 and 152 are provided with bends 154 in an opposite direction from the bend of the part cylindrical portion 136 and through an angle of approximately 45°.

The base 34 of the enclosure body 20 is provided with a pair of protruding parallel ribs 156 and 158 adjacent to the walls 30 and 32, respectively. The ribs 156 and 158 are interconnected by a crossbar 160, the length of the crossbar being slightly greater than the width of the central strip 134 of the clamp 26. Also, each of the ribs 156 and 158 has a slot 162 extending therein parallel to the plane of the base 34, and the slots 162 are adapted to receive the tabs 144 and 146 of the clamp 26. A recess 164 extends into the base 34 immediately adjacent to each of the slots 162 and is provided with a flat surface 166 between the slot 162 and the rear end 137 of the enclosure body 20. The clamp 26 is mounted on the enclosure body by inserting the tabs 144 into the slots 162, thereby positioning the fingers 150 and 152 in the recesses 164 in engagement with the surfaces 166, thereby retaining the clamp 26 in position. The strip 134 of the clamp 26 extends over the crossbar 160, and the part cylindrical portion 136 of the clamp 26 is spring biased into abutment with the surface of the base 34.

FIG. 4 illustrates the stylus assembly 28. The stylus assembly 28 has a stylus drive arm 168 which carries at its end a pair of styli 170 on opposite sides of the arm 168. The arm 168 is positioned in the V-shaped recess 96 of the yoke 16 exterior of the casing 24. The arm 168 is disposed parallel to the central axis of the casing 24 and is coupled to a mounting stub 172 by means of a sleeve 174 of compliant material which has a cylindrical contour of substantially greater diameter than the drive arm 168. The end of the stub 172 opposite the sleeve 174 is generally cylindrical and disposed between the part cylindrical portion 136 of the clamp 26 and the confronting surface of the base 34 of the enclosure body 20, thereby securing the stub 172 onto the casing 24. The stub has an outwardly extending arm 178 permitting rotation of the drive arm 168 to position a different stylus 170 in confrontation with a record, and a stop lug 180 protrudes from the cylindrical portion of the stub 172 in the plane of the arm 178 to maintain the rotational position of the drive arm 168 by abutment with the clamp 26. A pair of ribs 182 and 184 protrude from the surface of the base 34 on opposite sides of the stub 172 to maintain the drive arm 168 parallel to the axis of elongation of the casing 24, and a part cylindrical recess 186 formed in the surface of the base 34 accommodates the compliant sleeve 174 in abutment with the casing 24.

Figure 13:
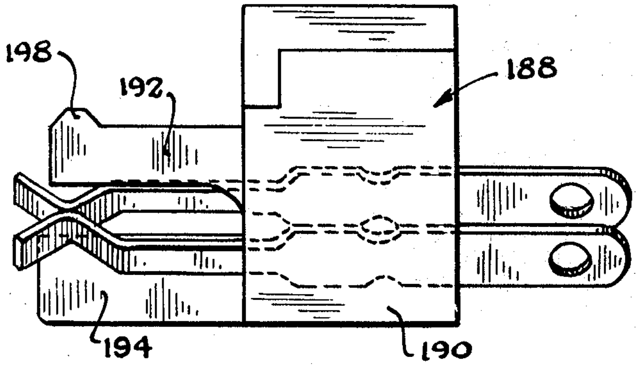
FIG. 13 is a side elevational view of an end plug connector for the phonograph pickup cartridge illustrated in FIGS. 1 through 12.
Figure 14:
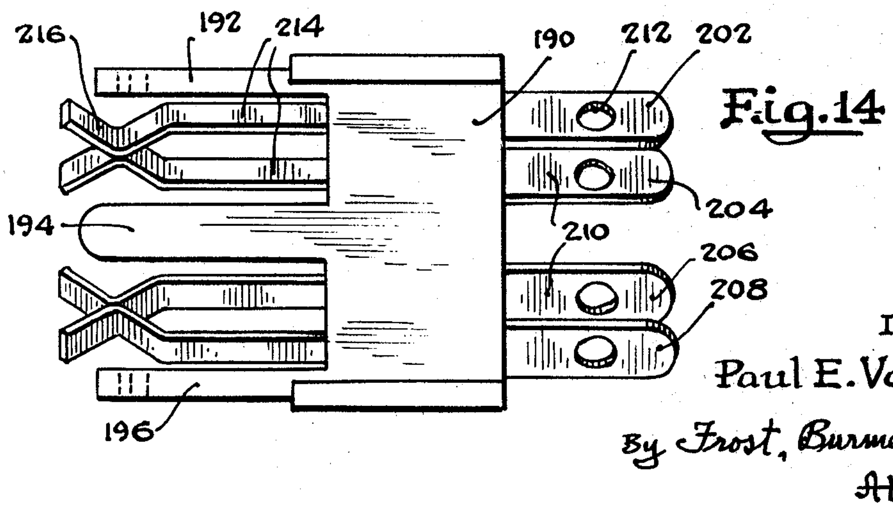
FIG. 14 is a plan view of the connector plug of FIG. 13.

It will be noted that the generating elements 12 and 14 extend through the backpad 18 and protrude from the opposite side of the backpad from the yoke 16. The electrodes 78 and 80 on the opposite surfaces of the generating elements 12 and 14 also extend through to the ends of these elements opposite the yoke 16, and therefore the electrodes 78 and 80 of the generating elements 12 and 14 are directly accessible from the end 137 of the casing 24. FIGS. 13 and 14 illustrate a connector which fits within the end 137 of the casing 24 and directly engages the electrodes on the generating elements 12 and 14.

It will be noted from FIGS. 3 and 10, that the walls 30 and 32, base 34, and cover 22 provide a generally rectangular opening at the rear end 137 of the casing 24. A male plug 188 is accommodated by this recess, and the plug 188 is illustrated in FIGS. 13 and 14. The plug has a hub 190 which is disposed exterior of the casing 24, and three protruding parallel strips 192, 194 and 196 extend from one side of the hub 190. The central strip of these three, designated 194 is slidably disposed between the ribs 118 disposed on the interior surface of the cover 22 which serve as a guideway for the strip 194. The other two strips 192 and 196 extend into the casing 26 adjacent to the walls 30 and 32 and adjacent to the base 34. Each of these strips has a protrusion 198 adjacent to the end thereof opposite the hub 190 extending away from the strip 194, and each of the protrusions 198 mates with a recess 200 in the inner surface of the base 34 (FIGS. 5 and 6) to anchor the plug 188 onto the casing 24.

Four parallel electrically connecting terminal strips 202, 204, 206 and 208 extend through the hub 190. The portion 210 of each of the strips extending from the side of the hub 190 opposite the strips 192, 194 and 196 is provided with an aperture 212 for receiving an electrical connector and is adapted to be soldered on the connector. The portions 214 of each of the strips extending from the other side of the hub 190 are provided with oppositely directed confronting bends 216 which are abutting when the plug 188 is exterior of the casing 24. When the plug is inserted into the recess in the end 137 of the casing 24, the terminal strips 202 and 204 engage the electrodes 78 and 80, respectively of the generating element 14 which protrude from the backpad 18, and the terminal strips 206 and 208 engage the electrodes 80 and 78, respectively, of the generating element 12. It is to be noted that the plug 188 makes direct contact with the electrodes on the generating elements and no separate connector is provided between these electrodes and the terminals of the plug.

The design and construction of a phonograph pickup cartridge according to the present invention greatly facilitates assembly and reduces the amount of hand labor required to construct a stereophonic phonograph pickup. The generating element assembly 10 is preferably fabricated in a single molding operation, as will be hereinafter described, and the enclosure body 20 and cover 22 of the casing are also provided in a single molding operation. As illustrated in FIG. 1, the generating element assembly 10 may simply be placed in position within the enclosure body 20 in the first step of assembly. In a second assembly step, the cover 22 may simply be positioned on the enclosure body by inserting the flange 102 of the cover 22 beneath the lip 98 of the enclosure body and forcing the cover 22 downwardly to engage the tabs 116. The third step in assembling the cartridge is illustrated in FIG. 3, and requires the clamp 26 to be inserted into the slots 162 so that the fingers 150 and 152 will engage the recesses 164 and secure the clamp 26 in position. The fourth and final step in the final assembly of the cartridge is to insert the stub 172 of the stylus assembly 28 beneath the part cylindrical portion 136 of the clamp 26 and secure the stylus assembly 28 onto the casing in this manner.

Figures 16, 17, 18, 19:
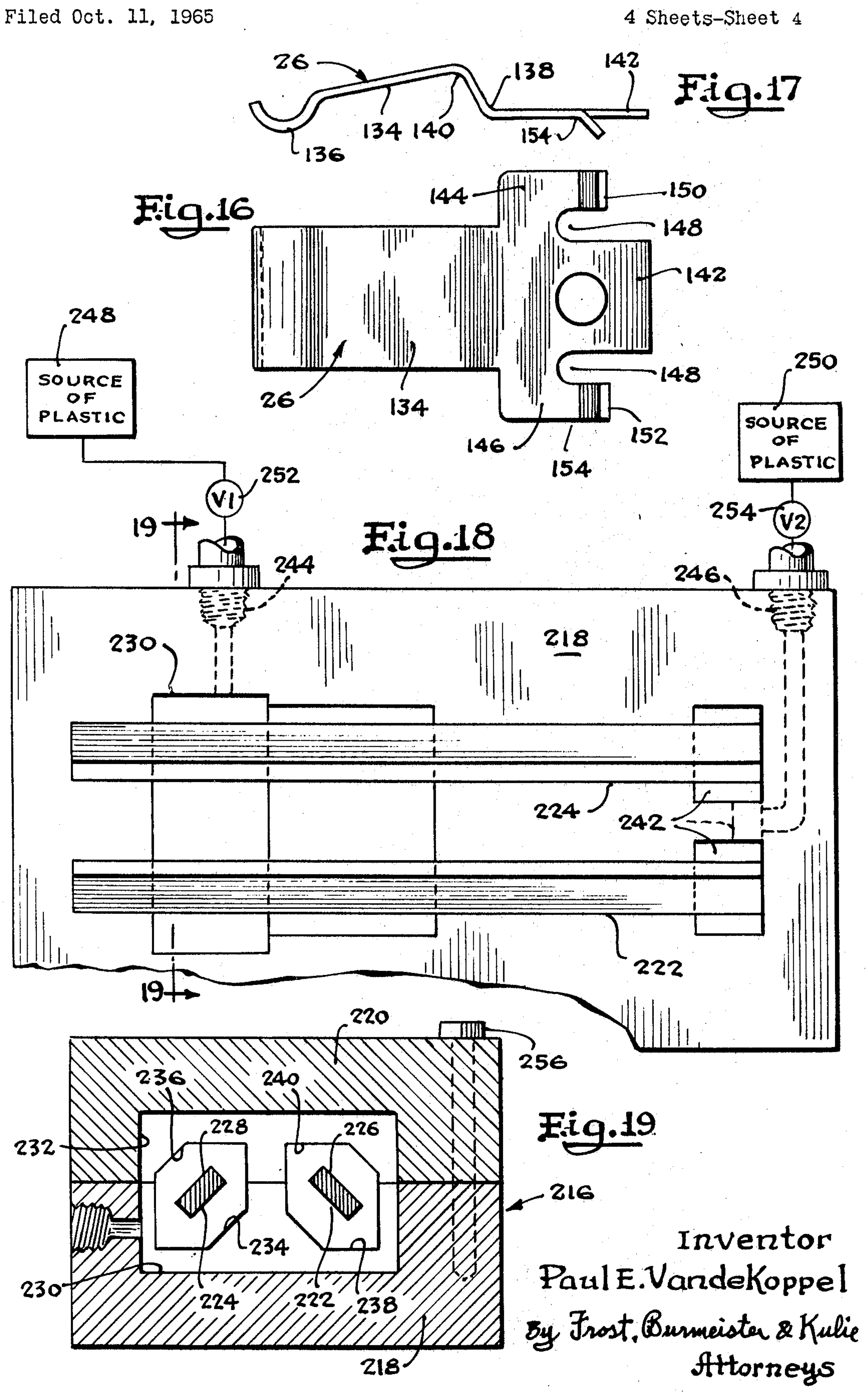
FIG. 16 is a bottom view of a clamp for mounting the stylus assembly on the casing of the phonograph pickup of FIGS. 1 through 15.
FIG. 17 is a side elevational view of the clamp of FIG. 16.
FIG. 18 is a plan view of a mold for simultaneously molding and mounting the backpad and yoke on the piezoelectric elements of the phonograph pickup of FIGS. 1 through 17, the elements being shown in position and the figure being partly diagrammatic.
FIG. 19 is a sectional view taken along the line 19—19 of FIG. 18.

FIGS. 18 and 19 illustrate the manner in which the generating element assembly 10 is fabricated by a molding process. In these figures, a mold 216 is illustrated having a base 218 and a top portion 220. The base 218 is provided with a pair of parallel recesses 222 and 224 extending therein from the surface thereof. The recesses 222 and 224 constitute a portion of a quadrangular recess and are aligned with the remaining portions 226 and 228 of the quadrangular recess which are disposed in the top portion 220 of the mold 216. The combined recesses 222 and 226 form a single cavity having the cross section and length of the generating element 12, and the combined recesses 224 and 228 form a single cavity having the cross section and length of the generating element 14. It is to be noted that the cavity formed by the recesses 222 and 226 has a width axis which is perpendicular to the width axis of the cavity formed by the recesses 224 and 228. Hence, the cavities thus formed receive the generating elements 12 and 14 and mount them with their width axes perpendicular to each other, in the manner required of the generating element assembly.

The recesses 222 and 224 in the base 218 of the mold 216 are interconnected by a rectangular recess 230 which mates with a rectangular recess 232 in the top portion 220 of the mold to form the contour of the backpad 18. In like manner, the base 218 and top portion 220 are provided with recesses forming the contour of the sleeve 56 which are designated 234 and 236, respectively and which extend from the recesses 230 and 232, respectively. Also, a cavity in the form of the sleeve 58 is formed extending from the recesses 230 and 232 by recesses 238 and 240.

The base 218 is also provided with a Y-shaped recess 242 which encompasses the recesses 222 and 224 at the ends thereof opposite the recess 230. The Y-shaped recess 242 is aligned with mating recesses, not shown, in the top portion 220 of the mold to complete the contour of the yoke 16.

A port 244 is provided in the base 218 communicating with the recess 230, and a second port 246 is provided in the base 218 communicating with the interconnecting portion of the Y-shaped recess 242. These ports are connected to a source of molten plastic for injection molding, and as illustrated in FIG. 18, separate sources 248 and 250 are connected through separate valves 252 and 254, respectively, to the ports 244 and 246. In this manner, a different plastic may be utilized to form the backpad 218 and the sleeves 56 and 58 from that utilized to form the yoke 16. It is to be understood however that a single source of molten plastic may be utilized through a single valve to form both the backpad 18 and the yoke 16. It is preferable under most constructions to provide a more compliant plastic for the yoke 16 than for the backpad 18, and that may be accomplished by the use of separate sources of molten plastic 248 and 250.

The generating element assembly may be formed utilizing the mold 216 by first positioning the generating elements 12 and 14 in the base 218 of the mold, and thereafter securing the top portion 220 of the mold in position by tightening bolts illustrated at 256. Thereafter, the valves 252 and 254 may be opened to injection mold both the backpad 18 with its associated sleeves 56 and 58 and the yoke 16. The completed assembly may then be removed from the mold 216.

Those skilled in the art will readily devise many modifications of the present invention as here disclosed, and further will find many applications for the present invention over and above those here disclosed. It is therefore intended that the scope of the present invention be not limited by the foregoing disclosure.

The invention claimed is:

1. A phonograph pickup cartridge comprising a casing having a side, a pair of adjacent parallel spaced ribs protruding from said side, each of said ribs having a slot extending therein confronting a first end of the casing, the side of said casing having a recess disposed therein between each slot and the first end of the casing, a clamp constructed of a sheet of resilient material having a central axis and a width normal to the central axis smaller than the distance between the ribs and two lugs extending outwardly from opposite sides of the central axis, each of said lugs being disposed in the slot in one of the ribs, each of said lugs having a finger extending into the adjacent recess in the casing and securing the clamp against translation out of the slots in the ribs, said clamp having a portion extending on the opposite side of the lugs from the first end of the casing and spring biased toward the side of the casing, said casing having an opening on the opposite side of the clamp from the first end of the casing, a generating element assembly disposed within the casing having a drive yoke extending to the exterior of the casing through the opening, and a stylus assembly having a stub, a stylus drive arm, and a stylus mounted on the drive arm, said drive arm being coupled mechanically to the stub by a hinge joint, the stub being disposed between the spring biased portion of the clamp and the side of the casing, said drive arm engaging the portion of the yoke protruding from the opening in the side of the casing.

2. A phonograph pickup cartridge comprising a casing having a generally flat side, a pair of parallel ribs protruding from said side, each of said ribs having a slot extending therein in a common plane parallel to the flat side and confronting a first end of the casing, the flat side of said casing having a recess disposed therein between each slot and the first end of the casing, said casing also having a bar protruding from the flat side and extending normally between the ribs on the side of the slots opposite the first end of the casing, a clamp constructed of a sheet of resilient material having a central axis and a width normal to the central axis smaller than the distance between the ribs and two lugs extending outwardly from opposite sides of the central axis in the same plane, each of said lugs being disposed in the slot in one of the ribs, each of said lugs having a finger extending therefrom toward the first end of the casing and into the adjacent recess in the casing and securing the clamp against translation out of the slots in the ribs, said clamp having a portion extending from the lugs over the bar of the casing and terminating adjacent to the casting, said portion having bends in opposite directions on opposite sides of the bar of the casing and being spring biased toward the casing in the region of termination, said casing having an opening on the opposite side of the clamp from the first end of the casing, a generating element assembly-disposed within the casing having a drive yoke extending to the exterior of the casing through the opening, and a stylus assembly having a stub, a stylus drive arm, and a stylus mounted on the drive arm, said drive arm being coupled mechanically to the stub by a hinge joint, the stub being disposed between the spring biased portion of the clamp and the flat side of the casing and the drive arm engaging the portion of the yoke protruding from the opening in the side of the casing.

3. A phonograph pickup cartridge comprising a casing having a generally flat side, a pair of parallel ribs protruding from said side, each of said ribs having a slot extending therein in a common plane parallel to the flat side and confronting a first end of the casing, the flat side of said casing having a recess disposed therein between each slot and the first end of the casing, said casing having a bar protruding from the flat side and extending normally between the ribs on the side of the slots opposite the first end of the casing, said casing also having a part cylindrical recess spaced from the bar and disposed on the opposite side of the bar from the first end of the casing, a clamp constructed of a sheet of resilient material having a central axis and a width normal to the central axis smaller than the distance between the ribs and two lugs extending outwardly from opposite sides of the central axis in the same plane, each of said lugs being disposed in the slot in one of the ribs, each of said lugs having a finger extending therefrom toward the first end of the casing and into the adjacent recess in the casing and securing the clamp against translation out of the slots in the ribs, said clamp having a portion extending from the lugs over the bar of the casing and terminating adjacent to the casing, said portion having bends in opposite directions on opposite sides of the bar of the casing and being spring biased toward the casing in the region of termination, said casing having an opening on the opposite side of the clamp from the first end of the casing, a generating element assembly disposed within the casing having a drive yoke extending to the exterior of the casing through the opening, and a stylus assembly having a stub, a stylus drive arm, a stylus mounted on the drive arm, and sleeve of compliant material having a cylindrical exterior surface mounted on one end of the stub and one end of the drive arm, the other end of the stub being disposed between the spring biased portion of the clamp and the flat side of the casing, the sleeve being disposed in the part cylindrical recess of the casing and the drive arm engaging the portion of the yoke protruding from the opening in the side of the casing.

4. A phonograph pickup cartridge comprising a casing having a generally flat side, a pair of parallel ribs protruding from said side, each of said ribs having a slot extending therein in a common plane parallel to the flat side and confronting a first end of the casing, the flat side of said casing having a recess disposed therein between each slot and the first end of the casing, said casing also having a bar protruding from the flat side and extending normally between the ribs on the side of the slots opposite the first end of the casing, said casing also having a part cylindrical recess parallel to the ribs and spaced from the bar and disposed on the opposite side of the bar, from the first end of the casing and a flat slot disposed normal to the axis of the part cylindrical portion between the part cylindrical portion and the ribs, a clamp constructed of a sheet of resilient material having a central axis and a width normal to the central axis smaller than the distance between the ribs and two lugs extending outwardly from opposite sides of the central axis in the same plane, each of said lugs being disposed in the slot in one of the ribs, each of said lugs having a finger extending therefrom toward the first end of the casing and into the adjacent recess in the casing and securing the clamp against translation out of the slots in the ribs, said clamp having a portion extending from the lugs over the bar of the casing and terminating adjacent to the casing, said portion having bends in opposite directions on opposite sides of the bar of the casing and being spring biased toward the casing in the region of termination, said casing having an opening on the opposite side of the clamp from the first end of the casing, a generating element assembly disposed within the casing having a drive yoke extending to the exterior of the casing through the opening, and a stylus assembly having a stub, a stylus drive arm, and two styli mounted on opposite sides of the drive arm, a sleeve of compliant material having a cylindrical exterior surface disposed in the part cylindrical recess of the casing mounted on one end of the stub and on one end of the drive arm, the other end of the stub being disposed between the spring biased portion of the clamp and the flat side of the casing, the stub having a protruding lever in the plane of the slot, and the drive arm engaging the portion of the yoke protruding from the opening in the side of the casing.

5. A phonograph pickup cartridge comprising, in combination: a casing having an enclosure body and a cover, the enclosure body comprising a base, a first wall and a second wall extending from opposite sides of the base forming a recess, and a bulkhead extending between the first and second wall at one end of the recess, said bulkhead having a lip extending toward the opposite end of the recess and spaced from the base, the cover having a flange extending from one end thereof adapted to be positioned within the recess of the enclosure body in abutment with the lip, said enclosure body having a latch disposed remote from the bulkhead and engaging the cover, the casing having an opening confronting the recess of the enclosure body; a generating element assembly disposed within the casing comprising a generating element, a yoke mounted on the generating element and extending through the opening, and a backpad mounted on a portion of the generating element spaced from the yoke, said backpad being disposed within the casing and wedged between the base of the enclosure body and the cover; and a stylus exterior of the casing mounted on the yoke.

6. A phonograph pickup cartridge comprising, in combination: a casing having an enclosure body and a cover, the enclosure body comprising a base, a first wall and a second wall extending from opposite sides of the base forming a recess, and a bulkhead extending between the first and second wall at one end of the recess, said bulkhead having a lip extending toward the opposite end of the recess and spaced from the base, the cover having a flange extending from one end thereof adapted to be positioned within the recess of the enclosure body in abutment with the lip, said enclosure body having a latch disposed remote from the bulkhead and engaging the cover, the casing having an opening confronting the recess of the enclosure body adjacent to the bulkhead, said enclosure body having two spaced protrusions extending into the recess from the base; a generating element assembly disposed within the casing comprising a generating element, a yoke mounted on the generating element and extending through the opening, and a backpad mounted on a portion of the generating element spaced from the yoke, said backpad being disposed within the casing between the spaced protrusions on the base and wedged between the base of the enclosure body and the cover; and a stylus assembly exterior of the casing comprising a drive arm compliantly mounted on the casing and engaging the portion of the yoke exterior of the casing, and a stylus mounted on the drive arm remote from the casing.

7. A phonograph pickup cartridge comprising, in combination: a casing having an enclosure body and a cover, the enclosure body comprising a base, a first wall and a second wall extending from opposite sides of the base forming a recess, and a bulkhead extending between the first and second wall at one end of the recess, said bulkhead having a lip extending toward the opposite end of the recess and spaced from the base, the cover having a flange extending from one end thereof adapted to be positioned within the recess of the enclosure body in abutment with the lip, said cover and a wall of the enclosure body having a mating key and slot to prevent translation of the cover parallel to the walls, said enclosure body having a latch disposed on each wall remote from the bulkhead, each of said latches extending above the wall and having a hook extending normally from said wall into the recess and engaging the cover, the casing having an opening confronting the recess of the enclosure body adjacent to the bulkhead; a generating element assembly disposed within the casing comprising a generating element, a yoke mounted on the generating element and extending through the opening, and a backpad mounted on a portion of the generating element spaced from the yoke, said backpad being disposed within the casing and wedged between the base of the enclosure body and the cover; and a stylus assembly exterior of the casing comprising a drive arm compliantly mounted on the casing and engaging the portion of the yoke exterior of the casing, and a stylus mounted on the drive arm remote from the casing.

8. A phonograph pickup cartridge comprising, in combination: a casing having an enclosure body and a cover, the enclosure body comprising a generally flat base, a generally flat first wall and a generally flat second wall extending normally from opposite sides of the base forming a recess, and a bulkhead extending between the first and second wall at one end of the recess, said bulkhead having a lip extending toward the opposite end of the recess and spaced from the base, the cover having a flange extending from one end thereof adapted to be positioned within the recess of the enclosure body in abutment with the lip, said cover having outwardly extending shoulders abutting the edges of the walls opposite the base and being provided with recesses mating with protrusions on the edges of the walls opposite the base to prevent translation of the cover relative to the enclosure body parallel to the walls, said cover having a protrusion extending toward the enclosure body confronting the protrusion of the base nearest the other end of the enclosure body, said enclosure body having a latch disposed on each wall remote from the bulkhead, each of said latches extending above said wall and the cover and having a hook extending normally from said wall into the recess and engaging the cover, the casing having an opening confronting the recess of the enclosure body adjacent to the bulkhead, said enclosure body having two spaced protrusions extending into the recess from the base; a generating element assembly disposed within the casing comprising a generating element, a yoke mounted on the generating element and extending through the opening, and a quadrangular backpad mounted on a portion of the generating element spaced from the yoke, said backpad being disposed within the casing between the spaced protrusions of the base and abutting the protrusion of the cover, and wedged between the base of the enclosure body and the cover; and a stylus assembly exterior of the casing comprising a drive arm compliantly mounted on the casing and engaging the portion of the yoke exterior of the casing, and a stylus mounted on the drive arm remote from the casing.

9. A phonograph pickup comprising a casing having a recess extending therein from an orifice, said casing having an opening remote from the orifice, a generating element assembly disposed within the recess of the cavity comprising a generating element, a yoke mounted on the generating element and extending through the opening of the casing, and a backpad, said backpad being mounted within the casing adjacent to the orifice and the generating element extending through the backpad, electrodes disposed on the generating element on the side of the backpad remote from the opening, a plug disposed in the orifice having electrically conducting contacts equal in number to the number of electrodes confronting the backpad, each of said contacts being constructed of resilient electrically conducting material, each of the electrodes of the generating element being in slideable abutment with a different contact of the plug and deflecting the contact outwardly. whereby the end of the element is directly engaged by the contacts of the plug, and a stylus mounted on the yoke adapted to follow the undulations of a record groove.

10. A phonograph pickup comprising a casing having a recess extending therein from an orifice, said casing having an opening remote from the orifice, a generating element assembly disposed within the recess of the cavity comprising a pair of elongated piezoelectric elements, each element having a pair of flat parallel sides provided with an electrode thereon and said elements generating electrical potentials of opposite sign on the electrodes thereof responsive to a force exerted on the element, said elements being disposed generally parallel to each other with the electrodes of one element generally normal to the electrodes of the other element, a yoke having a central portion and a pair of arms extending from the central portion, the end of each of said arms remote from the central portion being mounted on one of the elements and the central portion of the yoke extending through the opening of the casing, and a backpad mounted within the casing adjacent to the orifice, the generating element being mounted on the backpad and extending through the backpad, the electrodes disposed on the generating element extending on the side of the backpad remote from the opening, a plug disposed in the orifice having two pairs of electrically conducting contacts extending toward the backpad, the contacts being constructed of resilient material and the contacts of each pair being spring biased toward each other and slideably engaging the electrodes on opposite surfaces of one of the piezoelectric elements, each of the electrodes of the piezoelectric elements being in abutment with a different contact of the plug, and a stylus coupled to the yoke adapted to follow the undulations of a record groove.

11. A phonograph pickup cartridge comprising, in combination: a casing having an enclosure body and a cover, the enclosure body comprising a base, a first wall and a second wall extending from the opposite sides of the base forming a recess, and a bulkhead extending between the first and second wall at one end of the casing, the other end of the casing being an orifice, said bulkhead having a lip extending toward the opposite end of the casing and spaced from the base, the cover having a flange extending from one end thereof adapted to be positioned within the recess of the enclosure body in abutment with the lip, said enclosure body having a latch disposed remote from the bulkhead and engaging the cover, the casing having an opening confronting the recess of the enclosure body adjacent to the bulkhead, said casing having a pair of parallel ribs protruding from said base on the side opposite the recess, each of said ribs having a slot extending therein confronting a second end of the casing, the base of said casing having a recess disposed therein between each slot and the second end of the casing, a clamp constructed of a sheet of resilient material having a central axis and a width normal to the central axis smaller than the distance between the ribs and two lugs extending outwardly from the opposite sides of the central axis, each of said lugs being disposed in the slot in one of the ribs, each of said lugs having a finger extending into the adjacent recess in the casing and securing the clamp against translation out of the slots in the ribs, said clamp having a portion extending on the opposite side of the lugs from the second end of the casing and spring biased toward the base of the casing, said casing having an opening adjacent to the first end thereof, a generating element assembly disposed within the casing comprising a generating element, a yoke mounted on the generating element and extending through the opening of the casing, and a backpad, said backpad being mounted within the casing adjacent to the orifice and the generating element extending through the backpad, electrodes disposed on the generating element on the side of the backpad confronting the orifice, a plug disposed in the orifice having electrically conducting contacts extending toward the backpad, each of the electrodes of the generating element being in abutment with a different contact of the plug, and a stylus mounted on the yoke adapted to follow the undulations of a record groove.

12. A phonograph pickup cartridge comprising, in combination: a casing having an enclosure body and a cover, the enclosure body comprising a generally flat base, a generally flat first wall and a generally flat second wall extending normally from opposite sides of the base forming a recess, and a bulkhead extending between the first and second wall at one end of the recess, said bulkhead having a lip extending toward the opposite end of the recess and spaced from the base, the cover having a flange extending from one end thereof adapted to be positioned within the recess of the enclosure body in abutment with the lip, said cover having outwardly extending shoulders abutting the edges of the walls opposite the base and being provided with recesses mating with protrusions on the edges of the walls opposite the base to prevent translation of the cover relative to the enclosure body parallel to the walls, said cover having a protrusion extending toward the enclosure body confronting the protrusion of the base nearest the other end of the enclosure body, said enclosure body having a latch disposed on each wall remote from the bulkhead, each of said latches extending above said wall and the cover and having a hook extending normally from said wall into the recess and engaging the cover, the casing having an opening confronting the recess of the enclosure body adjacent to the bulkhead, said enclosure body having two spaced protrusions extending into the recess from the base, said casing having a pair of parallel ribs protruding from said base, each of said ribs having a slot extending therein in a common plane parallel to the flat base and confronting a second end of the casing, the flat base of said casing having a recess disposed therein between each slot and the first end of the casing, said casing also having a bar protruding from the flat base and extending normally between the ribs on the side of the slots adjacent to the first end of the casing, said casing also having a part cylindrical recess parallel to the ribs and spaced from the bar and disposed between the bar and the opening, and a flat slot disposed normal to the axis of the part cylindrical portion between the part cylindrical portion and the ribs, a clamp constructed of a sheet of resilient material having a central axis and a width normal to the central axis smaller than the distance between the ribs and two lugs extending outwardly from opposite sides of the central axis in the same plane, each of said lugs being disposed in the slot in one of the ribs, each of said lugs having a finger extending therefrom toward the end of the casing and into the adjacent recess in the casing and securing the clamp against translation out of the slots in the ribs, said clamp having a portion extending from the lugs over the bar of the casing and terminating adjacent to the casing, said portion having bends in opposite directions on opposite sides of the bar of the casing and being spring biased toward the casing in the region of termination, said casing having an opening on the opposite side of the clamp from the first end of the casing, a generating element assembly disposed within the casing comprising a pair of elongated piezoelectric elements, each element having a pair of flat parallel sides provided with an electrode thereon and said elements generating electrical potentials of opposite sign on the electrodes thereof responsive to a force exerted on the element, said elements being disposed generally parallel to each other with the electrodes of one element generally normal to the electrodes of the other element, a yoke having a central portion and a pair of arms extending from the central portion, the end of each of said arms remote from the central portion thereof being mounted on one of the elements and the central portion of the yoke extending through the opening of the casing, and a backpad mounted within the casing adjacent to the orifice, the generating elements being mounted on the backpad and extending through the backpad, the electrodes disposed on the generating element extending on the side of the backpad confronting the orifice, a plug disposed in the orifice having two pairs of electrically conducting contacts extending toward the backpad, the electrodes of each pair being spring biased toward each other and engaging the electrodes on opposite surfaces of one of the piezoelectric elements, each of the electrodes of the piezoelectric element being in abutment with a different contact of the plug, and a stylus assembly having a stub, a stylus drive arm, and two styli mounted on the opposite sides of the drive arm, a sleeve of compliant material having a cylindrical exterior surface disposed in the part cylindrical recess of the casing mounted on one end of the stub and on one end of the drive arm, the other end of the stub being disposed between the spring biased portion of the clamp and the flat side of the casing and the stub having a protruding lever in the plane of the slot, and the drive arm engaging the portion of the yoke protruding from the opening in the side of the casing.

13. A phonograph pickup comprising the combination of claim 9 wherein the generating element has two electrodes disposed on opposite sides thereof, and two contacts of the plug form a pair of jaws which slideably engage the two electrodes and exert spring pressure thereon.

References Cited

UNITED STATES PATENTS

| | | | |
|---|---|---|---|
| 2,652,260 | 9/1953 | Balier | 274—37 |
| 2,703,343 | 3/1955 | Snepvangers | 179—100.41 |
| 3,215,440 | 11/1965 | Wood | 274—36 |
| 3,327,069 | 6/1967 | White | 179—100.41 |

FOREIGN PATENTS

| | | |
|---|---|---|
| 1,179,730 | 10/1964 | Germany. |

LEONARD FORMAN, Primary Examiner

D. A. DEARING, Assistant Examiner

U.S. Cl. X.R.

179—100.41